United States Patent
Qin

(10) Patent No.: US 10,212,684 B2
(45) Date of Patent: *Feb. 19, 2019

(54) METHOD, APPARATUS, AND DEVICE FOR MANAGING BINDING INFORMATION ON NETWORK SIDE

(71) Applicant: Huawei Technologies Co., Ltd., Shenzhen (CN)

(72) Inventor: Xia Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/236,345

(22) Filed: Aug. 12, 2016

(65) Prior Publication Data

US 2016/0353400 A1 Dec. 1, 2016

Related U.S. Application Data

(63) Continuation of application No. 12/577,485, filed on Oct. 12, 2009, now Pat. No. 9,445,386, which is a
(Continued)

(30) Foreign Application Priority Data

Jul. 3, 2007 (CN) .......................... 2007 1 0118256
Jul. 20, 2007 (CN) .......................... 2007 1 0075248

(51) Int. Cl.
*H04L 1/00* (2006.01)
*H04W 60/00* (2009.01)
(Continued)

(52) U.S. Cl.
CPC ..... *H04W 60/005* (2013.01); *H04W 56/0015* (2013.01); *H04W 60/06* (2013.01);
(Continued)

(58) Field of Classification Search
CPC .. H04B 7/2121; H04B 7/2123; H04B 7/2615; H04J 2203/0069; H04J 4/00;
(Continued)

(56) References Cited

U.S. PATENT DOCUMENTS 6,795,920 B1 9/2004 Bacha et al.
6,804,221 B1 10/2004 Magret et al.
(Continued)

FOREIGN PATENT DOCUMENTS

CN 1620794 A 5/2005
CN 1697548 A 11/2005
(Continued)

OTHER PUBLICATIONS

Glass et al. RFC 3543 "Registration Revocation in Mobile 1 Pv4". Aug. 2003.
(Continued)

*Primary Examiner* — Dady Chery
(74) *Attorney, Agent, or Firm* — Leydig, Voit & Mayer, Ltd.

(57) ABSTRACT

A method, apparatus, and device for managing binding information on the network side are provided. The method includes the following steps: an entity on a network side sends a Binding Revocation Indication (BRI) message to an entity which stores binding relations of mobile nodes (MNs), where the binding relation includes a mapping between a home of address (HoA) of an MN and plurality of care of addresses (CoAs) of the MN and the BRI message includes at least one CoA ID; and the entity which stores the binding relations of MNs deletes the corresponding binding relation of at least one CoA ID in the BRI message after receiving the BRI message from the entity on the network side. Thus, with the present invention, the network side can delete the binding relation between a specified CoA and an
(Continued)

HoA in the case of plurality of CoAs, which makes it easier to maintain corresponding binding relations.

42 Claims, 6 Drawing Sheets

Related U.S. Application Data continuation of application No. PCT/CN2008/071464, filed on Jun. 27, 2008.

(51) Int. Cl.

| | | |
|---|---|---|
| *H04W 60/06* | (2009.01) | |
| *H04W 56/00* | (2009.01) | |
| *H04W 72/12* | (2009.01) | |
| *H04W 80/04* | (2009.01) | |
| *H04W 88/18* | (2009.01) | |
| *H04W 88/16* | (2009.01) | |

(52) U.S. Cl.
 CPC ........ *H04W 72/1263* (2013.01); *H04W 80/04* (2013.01); *H04W 88/16* (2013.01); *H04W 88/182* (2013.01)

(58) Field of Classification Search
 CPC ........... H04Q 2213/394; H04W 72/04; H04W 72/12; H04W 76/00; H04W 36/0083; H04W 36/0088; H04W 36/0094; H04L 5/26; H04L 1/0002; H04L 1/20
 USPC ................ 370/329, 330, 332, 333, 336, 337
 See application file for complete search history.

(56) References Cited

U.S. PATENT DOCUMENTS

| | | |
|---|---|---|
| 6,978,364 B1 | 12/2005 | Balaz et al. |
| 7,028,181 B1 | 4/2006 | McCullough et al. |
| 7,069,441 B2 | 6/2006 | Balaz et al. |
| 7,100,046 B2 | 8/2006 | Balaz et al. |
| 7,171,556 B2 | 1/2007 | Balaz et al. |
| 7,349,364 B2 | 3/2008 | Omae et al. |
| 2003/0073452 A1 | 4/2003 | Omae et al. |
| 2003/0153314 A1 | 8/2003 | Kim et al. |
| 2003/0224758 A1 | 12/2003 | O'Neill et al. |
| 2004/0047348 A1 | 3/2004 | O'Neill |
| 2004/0240393 A1 | 12/2004 | Nishida et al. |
| 2006/0177066 A1 | 8/2006 | Han et al. |
| 2006/0233144 A1 | 10/2006 | Matsumoto |
| 2006/0274670 A1 | 12/2006 | Matsumoto |
| 2009/0265767 A1 | 10/2009 | Rune et al. |
| 2009/0276533 A1 | 11/2009 | Xia |

FOREIGN PATENT DOCUMENTS

| | | |
|---|---|---|
| CN | 1816002 A | 8/2006 |
| CN | 1964317 A | 5/2007 |
| CN | 101350762 B | 11/2011 |
| EP | 1450543 A2 | 8/2004 |
| EP | 1657867 A1 | 5/2006 |
| EP | 1777976 A1 | 4/2007 |

OTHER PUBLICATIONS

Wakikawa et al., Multiple Care-of Addresses Registration (MCoA) draft-wakikawamobileip-multiplecoa-05; Monami6 Working Group; Internet-Draft; Expirers: Aug. 5, 2006; dated Feb. 2006 (13 pgs.).

Muhanna A. et al., "Binding Revocation for 1Pv6 Mobility; draft-muhanna-mip6-binding-revocation-01.txt", IETF Standard-Working-Draft, Internet Engineering Task Force, IETF, CH, No. 1, May 29, 2007, XP015050231 ISSN: 0000-0004.

Glass, "Registration Revocation in Mobile 1Pv4; rfc3543.txt," IETF Standard, Internet Engineering Task Force, IETF, CH, Aug. 1, 2003, XP015009325 ISSN: 0000-0003.

Wakikawa, R. et al., "Multiple Care-of Addresses registration draft-ietf-monarrii6-multiplecoa-00.txt," Internet Engineering Task Force, IETF, CH, Jun. 12, 2006.

Wakikawa, R. et al., "Multiple Care-of Addresses registration draft-ietf-monami6-multiplecoa-01.txt," Internet Engineering Task Force, IETF, CH, Oct. 2006.

Wakikawa, R. et al., "Multiple Care-of Addresses registration draft-ietf-monami6-multiplecoa-02.txt," Internet Engineering Task Force, IETF, CH, Mar. 5, 2007.

Wakikawa, R. et al., "Multiple Care-of Addresses registration draft-ietf-monami6-multiplecoa-03.txt," Internet Engineering Task Force, IETF, CH, Jul. 9, 2007.

Wakikawa, R. et al., "Multiple Care-of Addresses registration draft-ietf-monami6-multiplecoa-04.txt," Internet Engineering Task Force, IETF, CH, Nov. 19, 2007.

Wakikawa, R. et al., "Multiple Care-of Addresses registration draft-ietf-monami6-multiplecoa-05.txt," Internet Engineering Task Force, IETF, CH, Jan. 28, 2008.

Wakikawa, R. et al., "Multiple Care-of Addresses registration draft-ietf-monami6-multiplecoa-06.txt," Internet Engineering Task Force, IETF, CH, Feb. 24, 2008.

Wakikawa, R. et al., "Multiple Care-of Addresses registration draft-ietf-monami6-multiplecoa-07.txt," Internet Engineering Task Force, IETF, CH, Apr. 30, 2008.

Wakikawa, R. et al., "Multiple Care-of Addresses registration draft-ietf-monami6-multiplecoa-08.txt," Internet Engineering Task Force, IETF, CH, May 30, 2008.

Wakikawa, R. et al., "Multiple Care-of Addresses registration draft-ietf-monami6-multiplecoa-09.txt," Internet Engineering Task Force, IETF, CH, Aug. 28, 2008.

Wakikawa, R. et al., "Multiple Care-of Addresses registration draft-ietf-monami6-multiplecoa-10.txt," Internet Engineering Task Force, IETF, CH, Nov. 4,2008.

Wakikawa, R. et al., "Multiple Care-of Addresses registration draft-ietf-monami6-multiplecoa-11.txt," Internet Engineering Task Force, IETF, CH, Jan. 13, 2009.

Wakikawa, R. et al., "Multiple Care-of Addresses registration draft-ietf-monami6-multiplecoa-12.txt," Internet Engineering Task Force, IETF, CH, Mar. 6, 2009.

Wakikawa, R. et al., "Multiple Care-of Addresses registration draft-ietf-monami6-multiplecoa-13.txt," Internet Engineering Task Force, IETF, CH, Apr. 20, 2009.

Wakikawa, R. et al., "Multiple Care-of Addresses registration draft-ietf-monami6-multiplecoa-14.txt," Internet Engineering Task Force, IETF, CH, May 27, 2009.

Muhanna, A. et al., "Binding Revocation for 1Pv6 Mobility draft-muhanna-mip6-binding-revocation-00,txt," Internet Engineering Task Force, IETF, CH, May 24, 2007.

Muhanna, A. et al., "Binding Revocation for 1Pv6 Mobility draft-muhanna-mip6-binding-revocation-01,txt," Internet Engineering Task Force, IETF, CH, May 29, 2007.

Muhanna, A. et al., "Binding Revocation for 1Pv6 Mobility draft-muhanna-mip6-binding-revocation-02,txt," Internet Engineering Task Force, IETF, CH, Nov. 19, 2007.

Johnson, D. et al., "Mobility Support in 1Pv6," Internet Engineering Task Force, IETF, CH, Jun. 2004.

Wakikawa, R. et al., "Multiple Care-of Addresses Registration," Internet Engineering Task Force, IETF, CH, Oct. 2009.

U.S. Appl. No. 12/577,485, filed Oct. 12, 2009.

Gundavelli et al, "Proxy Mobile IPv6 draft-ietf-netlmm-proxymip6-00.txt," NETLMM WG, Internet-Draft, Intended status: Standards Track, IETF Trust, (Apr. 8, 2007).

METHOD, APPARATUS, AND DEVICE FOR MANAGING BINDING INFORMATION ON NETWORK SIDE

CROSS-REFERENCE TO RELATED APPLICATIONS

The present application is a continuation of U.S. patent application Ser. No. 12/577,485, filed on Oct. 12, 2009, which is a continuation of International Application No. PCT/CN2008/071464, filed on Jun. 27, 2008, which claims priority to Chinese Patent Application No. 200710118256.2, filed on Jul. 3, 2007 and Chinese Patent Application No. 200710075248.4, filed on Jul. 20, 2007. The afore-mentioned patent applications are hereby incorporated by reference in their entireties.

FIELD OF THE INVENTION

The present invention relates to communication technologies, and in particular, to a technology for managing binding information on the network side.

BACKGROUND OF THE INVENTION

At present, the Internet communication technology and mobile communication technology are widely used. To integrate the two communication technologies, a mobile Internet Protocol (IP) technology is developed. Based on mobile IP, this technology enables Internet applications in mobile communication systems.

In the mobile IP technology, each mobile device has a home of address (HoA) and a care of address (CoA). The CoA changes with the movement of a mobile device. When a mobile device moves to other areas, the mobile device needs to send the obtained CoA to a home agent (HA) so that the HA can forward the information destined for the mobile device to the CoA in time. Thus, the binding relation between the HoA of the HA of a mobile device and the CoA needs to be maintained on the HA.

In addition, for reasons of management and charging, an operation initiated by the network side for deleting a binding cache entry (BCE) of a mobile IP address needs to be supported in the network to delete corresponding binding relations.

In the prior art, the operation of deleting corresponding binding relations may be initiated by an HA or a local mobile anchor (LMA). The following describes the process of deleting corresponding binding relations in the prior art.

(1) The HA initiates the operation of deleting corresponding binding relations.

As shown in FIG. 1, the process in which the HA initiates the operation of deleting binding relations includes the following steps:

Step 1: The HA sends a Binding Revocation Indication (BRI) message to a mobile node (MN) to notify the MN to delete corresponding binding relations. The BRI message carries the HoA of the MN.

Step 2: After receiving the BRI message and deleting the corresponding binding relations of the HoA, the MN returns a Binding Revocation Acknowledgement (BRA) message to the HA to notify the HA that the MN has already deleted the corresponding binding relations.

(2) The LMA initiates the operation of deleting corresponding binding relations.

As shown in FIG. 2, when an MN moves from a source mobile access gateway (MAG) to a target MAG, the target MAG sends a Proxy Binding Update (PBU) message to the LMA to trigger the LMA to delete proxy bindings on the source MAG and send a Proxy Binding Acknowledgement (PBA) message to the target MAG. In this scenario, the LMA may initiate the process of deleting the binding relations, and the process includes the following steps:

Step 1: The LMA sends a BRI message carrying the HoA of the MN to the source MAG to notify the MN to delete binding relations.

Step 2: After receiving the BRI message and deleting the corresponding binding relations of the HoA carried in the BRI message, the source MAG returns a BRA message to the LMA, indicating that the corresponding binding relations have been deleted.

During the implementation of the present invention, the inventor finds at least the following defects in the prior art:

In the prior art, the corresponding binding relations on the network side cannot be maintained in a multi-interface scenario, namely, a scenario where an MN has a plurality of CoAs. That is, the network side cannot initiate an operation of deleting the binding relation between a specified CoA and an HoA.

SUMMARY OF THE INVENTION

Embodiments of the present invention provide a method, apparatus, and device for managing binding information on the network side so that the network side can delete a binding relation between a specified CoA and an HoA.

A method for managing binding information on the network side in an embodiment of the present invention includes: sending, by an entity on the network side, a BRI message to an entity which stores binding relations of MNs, where the binding relation includes a mapping between an HoA of an MN and a plurality of CoAs of the MN, where the BRI message includes at least one CoA ID information.

A method for managing binding information on the network side in an embodiment of the present invention includes: deleting, by an entity which stores binding relations of MNs, a corresponding binding relation of at least one CoA ID information carried in a BRI message after receiving the BRI message from an entity on the network side.

A network device in an embodiment of the present invention includes: a revocation request constructing unit 91, configured to construct a BRI message including at least one CoA ID; and a request sending unit 92, configured to send the BRI message constructed by the revocation request constructing unit 91 to an entity which stores binding relations of MNs, where the binding relation includes a mapping between an HoA of an MN and a plurality of CoAs of the MN.

A system for managing binding information on a network side, comprising an network device and an apparatus which is placed in an entity which stores binding relations of mobile nodes (MNs).

The network device is configured to send a Binding Revocation Indication (BRI) message to the apparatus which is placed in an entity which stores binding relations of mobile nodes (MNs), where the binding relation includes a mapping between a home of address (HoA) of an MN and plurality of care of addresses (CoAs) of the MN and the BRI message comprises at least one CoA ID.

The apparatus which is placed in an entity which stores binding relations of mobile nodes (MNs), configured to deleting the corresponding binding relation of at least one care of address (CoA) ID in the BRI message after receiving the BRI message from the entity on the network side.

In the technical solution provided in the embodiments of the present invention, the network side can delete the binding relation between a specified CoA and an HoA when a plurality of binding relations exist due to the plurality of CoAs. This solves the issue in the prior art and makes it easier to manage and maintain corresponding binding relations.

DETAILED DESCRIPTION OF THE INVENTION

Figure 1:
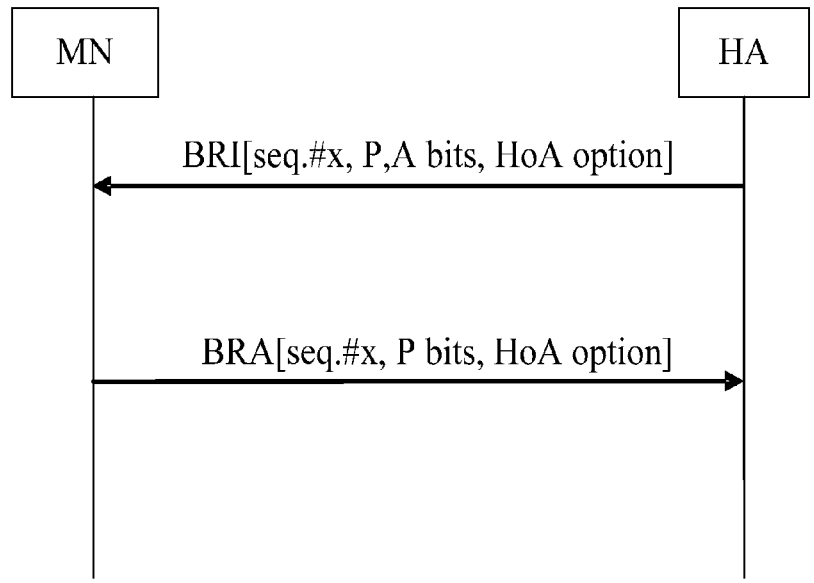
FIG. 1 shows a first process of deleting a binding relation in the prior art.
Figure 2:
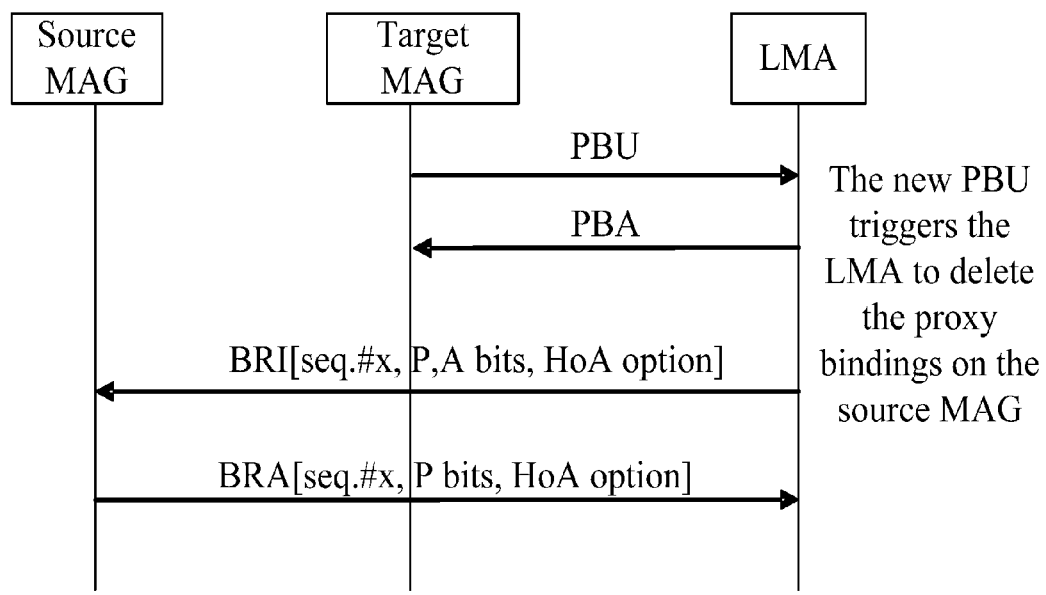
FIG. 2 shows a second process of deleting a binding relation in the prior art.

Embodiments of the present invention provide a technical solution to delete binding relations when a plurality of CoAs exist. In this technical solution, to delete a specified binding relation in an entity which stores binding relations of MNs, the entity on the network side may send a BRI message to the entity which stores binding relations of MNs. In this way, after receiving the BRI message, the entity which stores binding relations of MNs can delete the corresponding binding relation according to the CoA ID which configured to identify CoA in the BRI message. The binding relation includes a mapping between an HoA of an MN and a plurality of CoAs of an MN and the BRI message includes at least one CoA ID.

In one of the embodiments of the present invention, the BRI message may also carry MN identification information to help determine the binding relation to be deleted. The MN identification information may be an ID of an MN or HoA of an MN.

That is, in a scenario in which an MN has a plurality of CoAs, the entity on the network side may initiate the operation of deleting the binding relations between an HoA and all the CoAs in the entity which stores binding relations of MNs or only the binding relation(s) between an HoA and one or more specified CoAs. The entity on the network side may be but is not limited to an HA, an LMA, or an MAG; and the entity which stores binding relations of MNs may be but is not limited to an MN, an LMA, or an MAG.

The method for the network side to initiate the operation of deleting the binding relations between an HoA and a plurality of specified CoAs when the MN supports plurality of CoAs further includes the following steps:

Step 1: The entity on the network side sends a request for deleting the binding relations between an HoA and several specified CoAs. The request may be referred to as a BRI message or a binding deletion request. Their meanings are the same.

The request message may carry one or more of the following information combinations:

(1) HoA and CoA: intended to delete the binding relation(s) indexed by the HoA and one or more CoAs.

(2) HoA and BID: intended to delete the binding relation(s) indexed by the HoA and one or more binding IDs.

(3) MN ID and CoA: intended to delete the binding relation(s) indexed by the MN ID and one or more CoAs. Specifically, the HoA of an MN may be determined according to the MN ID and the binding relation between the corresponding HoA and the CoA may be further determined.

(4) MN ID and BID: intended to delete the binding relation(s) indexed by the MN ID and one or more binding IDs. Specifically, the HoA of an MN may be determined according to the MN ID and the binding relation between the corresponding HoA and the binding ID may be further determined.

(5) MN ID and information indicating that all binding relations need to be deleted, or HoA and information indicating that all binding relations need to be deleted: intended to delete all the binding relations of the HoA or MN ID.

Step 2: After receiving the request, the entity which stores binding relations of MNs deletes part or all of the binding relations and returns an acknowledgement message. Optionally, the acknowledgement message may carry the field contents carried in the request.

In the foregoing method, the BRI message and BRA message may be independent messages or may be included in other messages by adding corresponding options or fields.

The MN in the embodiments of the present invention may provide only one physical interface to connect to one physical network. When the MN has a plurality of prefixes; however, a plurality of CoAs are generated and all these CoAs are registered with the HA of the MN. Optionally, the MN in the embodiments of the present invention may provide a plurality of physical interfaces to connect to different physical networks. In this case, each network allocates a unique prefix to generate a unique CoA and the binging relations between the HoA and a plurality of CoAs are established on the HA.

Figure 3:
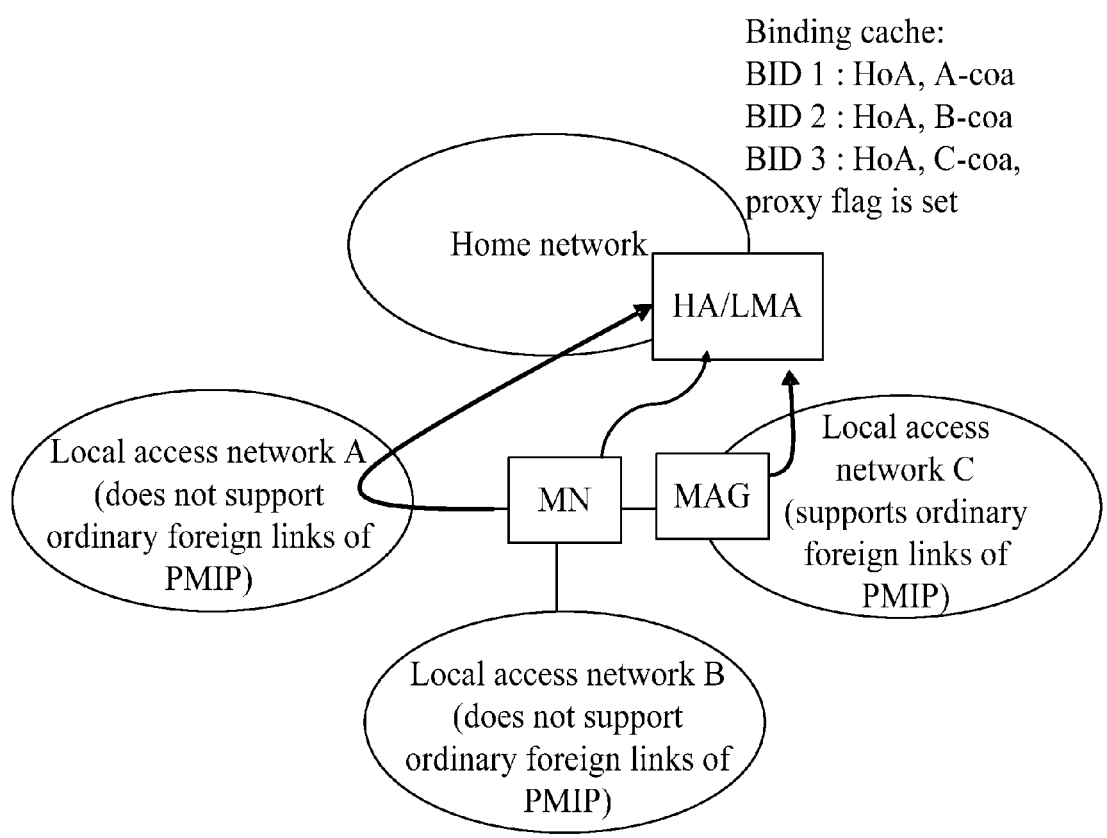
FIG. 3 and FIG. 4 show an application environment in which an HoA corresponds to a plurality of CoAs according to an embodiment of the present invention.

For example, as shown in FIG. 3, local access networks A, B, and C in the application scenario in an embodiment of the present invention may be different physical networks or different logical networks identified by different prefixes. Table 1 lists the binding relations between the HoA and a plurality of CoAs for the MN shown in FIG. 3.

TABLE 1

| BID | HoA | CoA | Other Features |
|---|---|---|---|
| BID 1 | HOA | A-COA | |
| BID 2 | HOA | B-COA | |
| BID 3 | HOA | C-COA | Proxy binding, established and maintained by the Proxy Mobile Internet Protocol (PMIP) |

Figure 4:
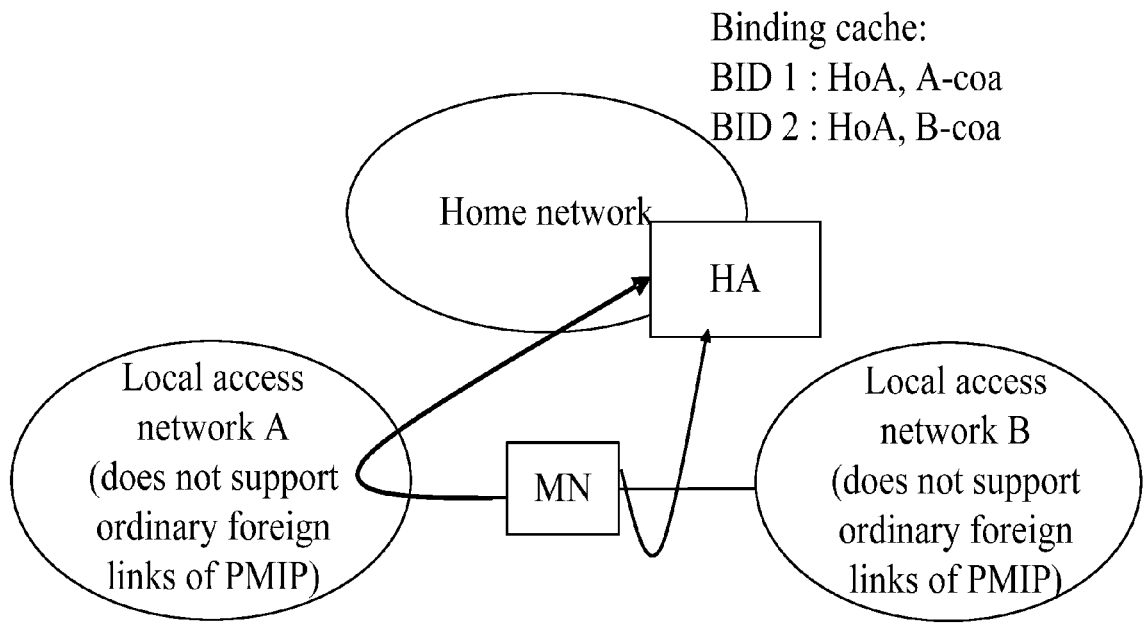

The network shown in FIG. 3 just exemplarily describes a scenario in which one HoA of an MN corresponds to a plurality of CoAs. Thus, those skilled in the art may understand that the following methods provided in the embodiments of the present invention may be applicable to scenarios (as shown in FIG. 4) in which one HoA corresponds to two CoAs or scenarios in which one HoA corresponds to more than two CoAs.

The technical solution in the embodiments of the present invention can manage and maintain the foregoing binding relations.

To better understand the embodiments of the present invention, the following describes the solution for managing corresponding binding relations in detail with reference to the accompanying drawings in the scenario in which one HoA of an MN corresponds to plurality of CoAs in an embodiment of the present invention.

Embodiment 1

Figure 5:
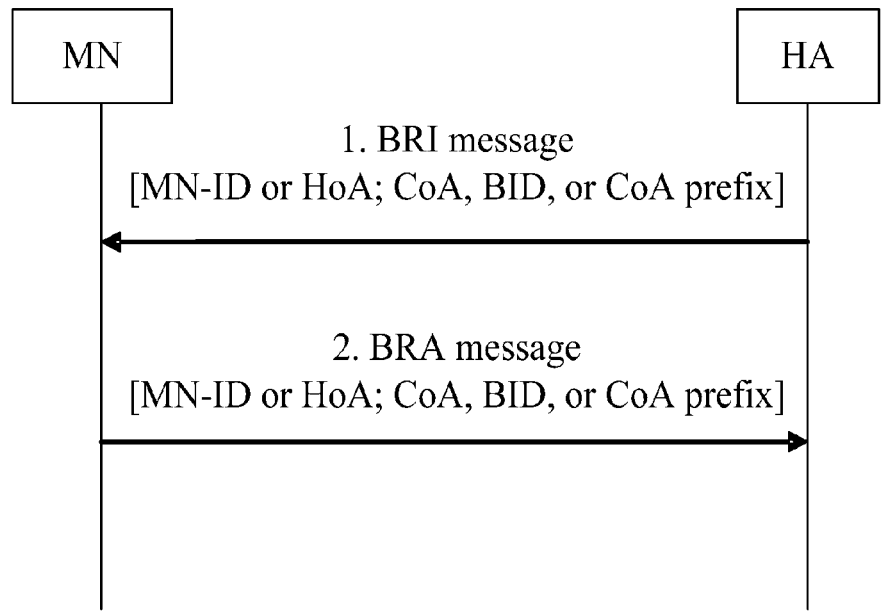
FIG. 5 and FIG. 6 show two methods of a first process according to an embodiment of the present invention.

In the case of a plurality of CoAs, as shown in FIG. 5, the process in which the HA initiates an operation of deleting the binding relation(s) of one or more specified CoAs in an MN includes the following steps:

Step 1: The HA sends a BRI message to the MN to indicate that the binding relation(s) between the HoA and one or more CoAs of the MN need(s) to be deleted.

The BRI message may carry at least the CoA ID. The BRI message may also carry other information such as MN identification information. To delete a plurality of binding relations on the MN, the BRI message may carry the plurality of CoA IDs.

For example, the BRI message may carry an MN-ID identifying an MN or an HoA of the MN; and a specified CoA, a BID identifying the binding corresponding to the CoA, or a CoA prefix.

Step 2: After receiving the BRI message, the MN returns a BRA message to the HA.

Specifically, the BRA message may carry all the options or fields in the BRI message or part of them such as the HoA, CoA, or BID.

In this step, after receiving the BRI message, the MN determines the corresponding binding relation from local binding relations according to the CoA ID in the received message, deletes the determined binding relation, and then returns a BRA message to the HA, indicating that the binding relation of the specified CoA has been deleted.

Figure 6:
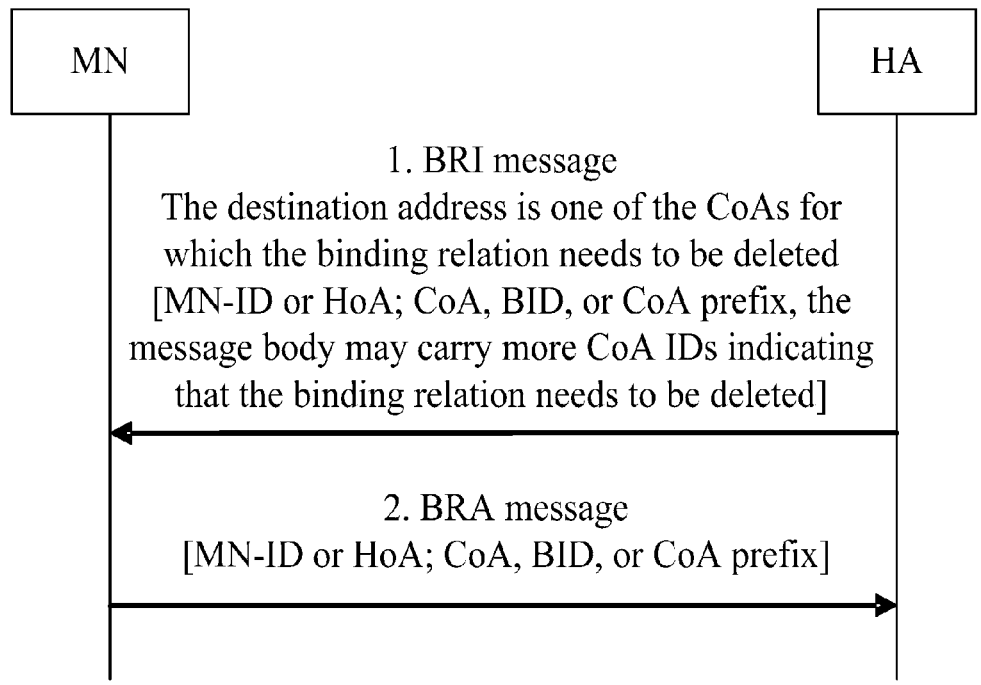

In the case of the plurality of CoAs, as shown in FIG. 6, the process in which the HA initiates the operation of deleting the binding relation(s) of one or more specified CoAs in an MN includes the following steps:

Step 1: The HA sends a BRI message to the MN. The destination IP address of the BRI message may be used to indicate that the binding relation between the HoA and one CoA in the MN needs to be deleted or the contents except the IP header in the BRI message may be used to indicate that the binding relation(s) between the HoA and one or more CoAs in the MN need to be deleted. In this case, the BRI message may also carry an instruction indicating whether the binding relation associated with the address specified by the destination IP address needs to be deleted. If the BRI message does not carry the instruction, the MN and HA may decide in advance whether to delete the binding relation associated with the address specified by the destination IP address by other means.

Step 2: After receiving the BRI message, the MN may delete the binding relation associated with the address specified by the destination IP address according to the instruction in the received message or the decision made by the MN and the HA. If the HA needs to delete only one binding relation, the BRI message may carry the following options or fields: MN identification information and BID. If the HA needs to delete a plurality of binding relations in the MN at the same time, the BRI message may carry a plurality of CoA IDs.

For example, the BRI message may carry an MN-ID identifying an MN or an HoA of the MN; and a specified CoA, a BID identifying the binding ID corresponding to the CoA, or a CoA prefix.

Step 3: After receiving the BRI message, the MN determines one or more binding relations according to the CoA ID in the received message or the binding relation indicated by the destination IP address, deletes the determined binding relation(s), and returns a BRA message to the HA, indicating that the corresponding binding relation(s) of the specified CoA has been deleted.

That is, the CoA ID may be at any position of a packet of the BRI message, for example, the destination address of the IP packet.

Embodiment 2

Figure 7:
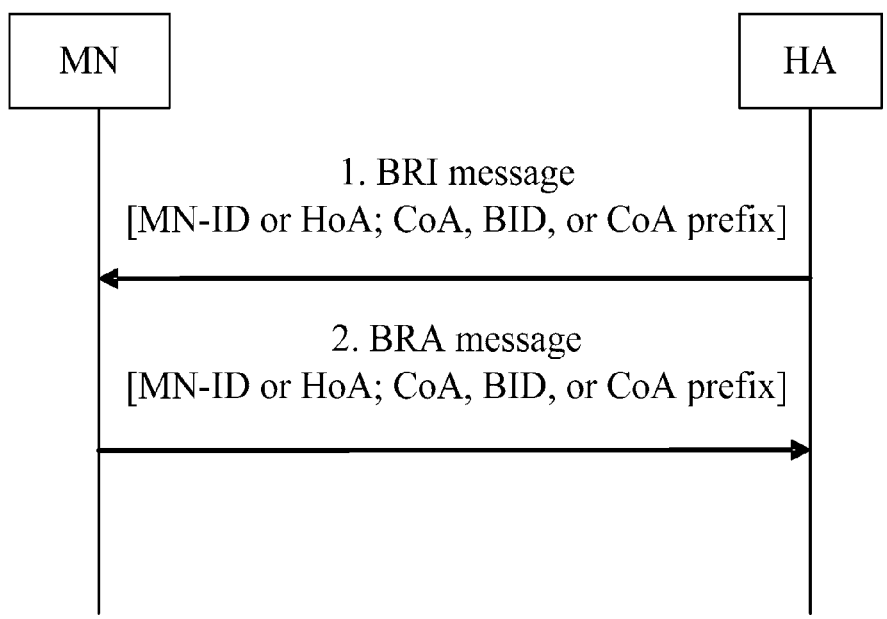
FIG. 7 shows a second process according to an embodiment of the present invention.

In the case of a plurality of CoAs, as shown in FIG. 7, the process in which the LMA initiates the operation of deleting the binding relation(s) of one or more specified CoAs in an MN from the MAG includes the following steps:

Step 1: The LMA sends a BRI message to the MAG to instruct the MAG to delete the binding relation(s) between the HoA of the MN and one or more specified CoAs.

The BRI message may carry at least the options or fields that specify the CoA ID and MN identification information, for example, MN-ID identifying an MN or HoA of the MN; and specified CoA, BID identifying the binding corresponding to the CoA, or CoA prefix.

Step 2: After receiving the BRI message, the MAG returns a BRA message to the LMA.

Specifically, the BRA message may carry all the options or fields in the BRI message or part of them such as the HoA, CoA, or BID.

In this step, after receiving the BRI message, the MAG determines one or more binding relations from local binding relations according to the CoA ID in the received message, deletes the determined binding relation(s), and then returns a BRA message to the LMA, indicating that the binding relation(s) of the specified CoA has been deleted.

Embodiment 3

Figure 8:
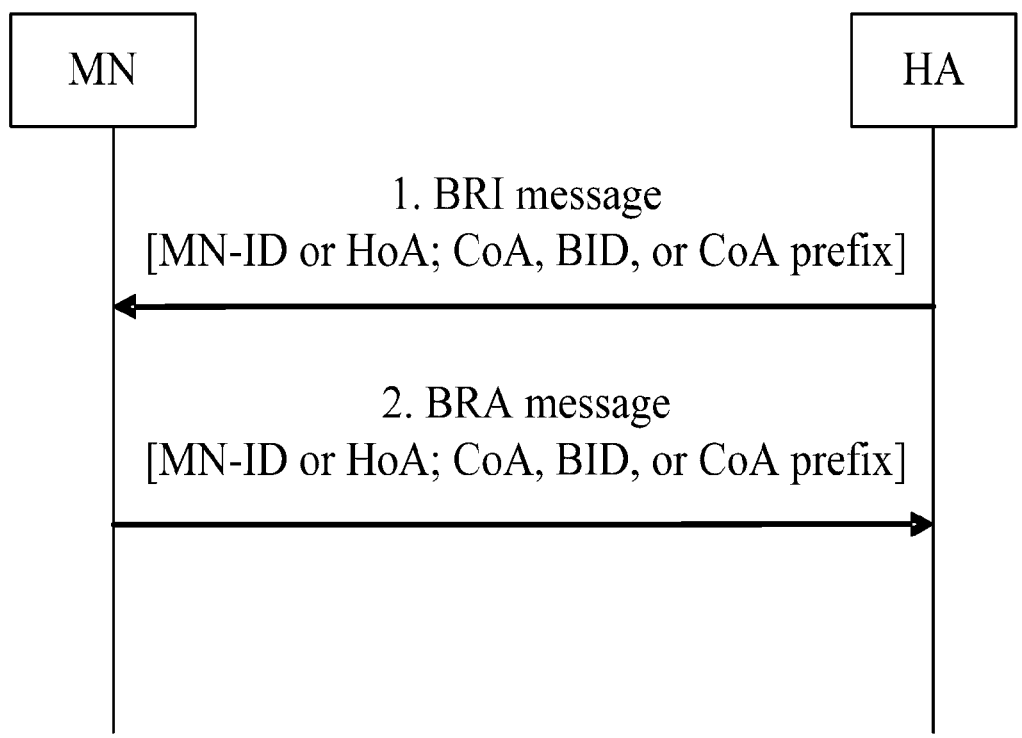
FIG. 8 shows a third process according to an embodiment of the present invention.

In the case of a plurality of CoAs, as shown in FIG. 8, the process in which the MAG initiates the operation of deleting the binding relation(s) of one or more specified CoAs in an MN from the LMA includes the following steps:

Step 1: The MAG sends a BRI message to the LMA to instruct the LMA to delete the binding relation(s) between the HoA of the MN and one or more specified CoAs.

The BRI message may carry at least the options or fields that specify the CoA ID and MN identification information, for example, MN-ID identifying an MN or HoA of the MN; and specified CoA, BID identifying the binding corresponding to the CoA, or CoA prefix.

Step 2: After receiving the BRI message, the LMA returns a BRA message to the MAG.

Specifically, the BRA message may carry all the options or fields in the BRI message or part of them such as the HoA, CoA, or BID.

Figure 9:
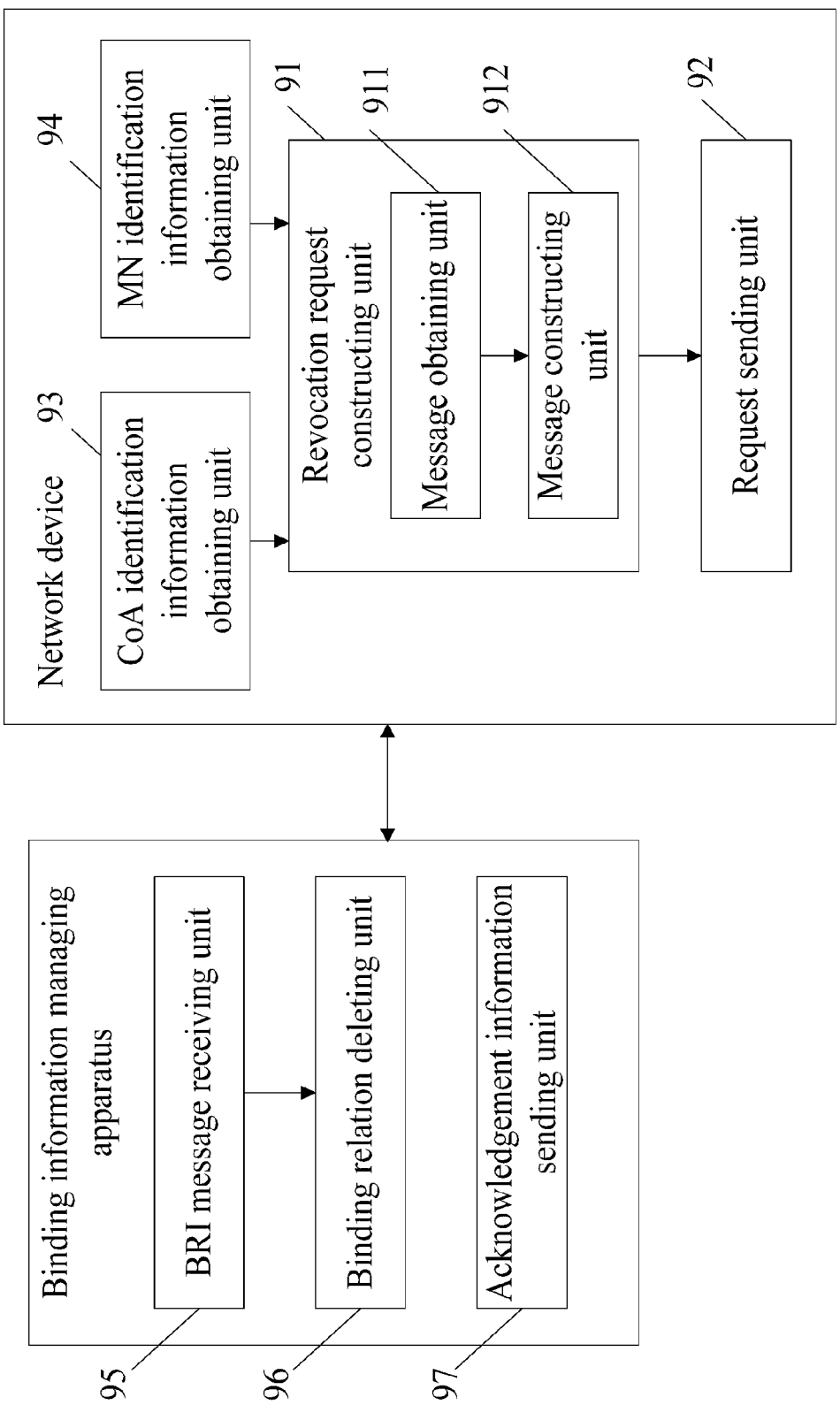
FIG. 9 shows structures of an apparatus and a device according to an embodiment of the present invention.

A network device is provided in an embodiment of the present invention. The network device may be an HA, an MAG, or an LMA and may be configured to delete the binding relations between the HoA and several specified CoAs. As shown in FIG. 9, the network device may include a revocation request constructing unit 91 and a request sending unit 92.

(1) The revocation request constructing unit 91 is configured to construct a BRI message including at least one CoA ID.

Specifically, the revocation request constructing unit 91 may construct an independent new message as the BRI message or modify other messages to obtain a corresponding BRI message. In the second case, the revocation request constructing unit 91 may further include: a message obtaining unit 911, configured to obtain the message sent from the entity on the network side to the entity which stores binding relations of MNs; and a message constructing unit 912, configured to add fields or options to the message obtained by the message obtaining unit 911 so as to obtain a BRI message including CoA IDs.

(2) The request sending unit 92 is configured to send the BRI message constructed by the revocation request constructing unit 91 to the entity which stores binding relations of MNs, where the binding relation includes a mapping between a HoA of an MN and plurality of CoAs of the MN.

Optionally, the network device may include a CoA identification information obtaining unit 93 and an MN identification information obtaining unit 94.

The CoA identification information obtaining unit 93 is configured to obtain the corresponding binding ID corresponding to the CoA, CoA information, or CoA prefix as the CoA ID and send the CoA ID to the revocation request constructing unit 91.

The MN identification information obtaining unit 94 is configured to obtain the ID or HoA of an MN as the identification information of the MN and send the identification information to the revocation request constructing unit 91 so that the identification information is carried in the BRI message.

An apparatus for managing binding information is provided in an embodiment of the present invention. The apparatus is placed in the entity which stores binding relations of MNs and is configured to delete the binding relations between an HoA and several specified CoAs according to the instruction sent from the foregoing network device. The apparatus may be also placed in an MN, an LMA, or an MAG. As shown in FIG. 9, the apparatus includes: a BRI message receiving unit 95, configured to receive a BRI message sent from an entity on a network side such as an HA, an MAG, or an LMA; and a binding relation deleting unit 96, configured to delete a corresponding binding relation of at least one CoA ID carried in the BRI message received by the BRI message receiving unit 95 according to the destination IP address and/or at least one CoA ID in the received BRI message.

Optionally, the apparatus may also include an acknowledgement information sending unit 97. The acknowledgement information sending unit 97 is configured to return a BRA message to the entity sending the BRI message on the network side after the binding relation deleting unit 96 deletes the corresponding binding relation. The BRA message may include part or all of the contents in the BRI message.

To sum up, the embodiments of the present invention can solve the issues in the prior art so that the network side can initiate an operation of deleting the binding relation between the specified CoA and the HoA when an MN has plurality of CoAs in a multi-interface scenario. This makes it easier to maintain corresponding binding relations and meets the requirements for applications such as management or charging.

Although the invention has been described through several exemplary embodiments, the invention is not limited to such embodiments. It is apparent that those skilled in the art may make various modifications and variations to the invention without departing from the scope of the invention. The invention is intended to cover the modifications and variations provided that they fall in the scope of protection defined by the following claims or their equivalents.

What is claimed is:

1. A method comprising:
sending, by a first entity on a network side, a first message to a second entity,
where the first message comprises an identifier (a) identifying at least one binding relation that is part of a plurality of binding relations and (b) indicating the at least one binding relation needs to be deleted,
where the plurality of binding relations comprises a plurality of mappings between information associated with a home address (HoA) and a plurality of care of addresses (CoAs),
where the HoA is used to identify a mobile node (MN) in a home network, and
where each of the plurality of CoAs is used to identify the MN in a foreign network; and
receiving, by the first entity, a second message from the second entity, where the second message comprises second information that includes at least a part of the first message.

2. The method of claim 1, where the first entity is a home agent (HA) and the second entity is the MN.

3. The method of claim 1, where the first message further comprises one or more of:
CoA information corresponding to the at least one binding relation;
a CoA prefix corresponding to the at least one binding relation;
a destination IP address carried in the first message; and
a part of the first message other than an IP header of the first message.

4. The method of claim 1, where the first message further comprises MN identification information, and the MN identification information comprises an identification (ID) or the HoA.

5. The method of claim 1, where fields or options are added to the first message sent from the first entity to the second entity.

6. The method of claim 1, where the MN has a physical interface with a plurality of prefixes, each of the plurality of prefixes is associated with a CoA among the plurality of CoAs.

7. The method of claim 1, where the MN has a plurality of interfaces, each of the plurality of interfaces has a prefix and each of the prefixes is associated with a CoA among the plurality of CoAs.

8. The method according to claim 1, wherein the first message is a Binding Revocation Indication (BRI) message, and the second message is a Binding Revocation acknowledgement (BRA) message.

9. The method according to claim 1, where the first entity is a local mobile anchor (LMA) and the second entity is a mobile access gateway (MAG).

10. The method according to claim 1, where the first entity is a mobile access gateway (MAG) and the second entity is a local mobile anchor (LMA).

11. A method comprising:
receiving, by a second entity, a first message from a first entity,
where the first message comprises an identifier (a) identifying at least one binding relation that is part of a plurality of binding relations and (b) indicating the at least one binding relation needs to be deleted,
where the plurality of binding relations comprises a plurality of mappings between information associated with a home address (HoA) and a plurality of care of addresses (CoAs),
where the HoA is used to identify a mobile node (MN) in a home network, and
where each of the plurality of CoAs is used to identify the MN in a foreign network; and
returning, by the second entity, a second message comprising second information that at least comprises a part of the first message.

12. The method of claim 11, where the first message further comprises one or more of:
CoA information corresponding to the at least one binding relation;
a CoA prefix corresponding to the at least one binding relation;
a destination IP address carried in the first message; and
a part of the first message other than an IP header of the first message.

13. The method according to claim 9, wherein the first message is a Binding Revocation Indication (BRI) message, and the second message is a Binding Revocation acknowledgement (BRA) message.

14. The method according to claim 11, where the first entity is a local mobile anchor (LMA) and the second entity is a mobile access gateway (MAG).

15. The method according to claim 11, where the first entity is a mobile access gateway (MAG) and the second entity is a local mobile anchor (LMA).

16. The method according to claim 11, where the first entity is home agent (HA) and the second entity is the MN.

17. The method according to claim 11, further comprising: deleting, by the second entity, the at least one binding relation.

18. The method according to claim 17, where the first entity is a mobile access gateway (MAG) and the second entity is a local mobile anchor (LMA).

19. The method according to claim 17, where the first entity is a local mobile anchor (LMA) and the second entity is a mobile access gateway (MAG).

20. The method according to claim 17, where the first entity is home agent (HA) and the second entity is the MN.

21. A first entity on a network side, comprising a processor and a memory, wherein the memory stores instructions that, when executed by the processor, cause the processor to implement operations, the operations comprising:
sending, a first message to a second entity,
where the first message comprises an identifier (a) identifying at least one binding relation that is part of a plurality of binding relations and (b) indicating the at least one binding relation needs to be deleted,
where the plurality of binding relations comprises a plurality of mappings between information associated with a home address (HoA) and a plurality of care of addresses (CoAs),
where the HoA is used to identify a mobile node (MN) in a home network and each of the plurality of CoAs is used to identify the MN in a foreign network; and
receiving, a second message from the second entity, where the second message comprises second information that at least comprises a part of the first message.

22. The first entity according to claim 12, where, the first entity is a home agent (HA) and the second entity is the MN.

23. The first entity according to claim 21, where the first message further comprises one or more of:
CoA information corresponding to the at least one binding relation;
a CoA prefix corresponding to the at least one binding relation;
a destination IP address carried in the first message; and
a part of the first message other than an IP header of the first message.

24. The first entity according to claim 21, where the first message further comprises MN identification information, and the MN identification information comprises an identification (ID) or the HoA.

25. The first entity according to claim 21, where fields or options are added to a Binding Revocation Indication (BRI) message sent from the first entity to the second entity.

26. The first entity according to claim 21, where the MN has a physical interface with a plurality of prefixes, each of the plurality of prefixes is associated with a CoA among the plurality of CoAs.

27. The first entity according to claim 2, the first entity is one of: a home agent (HA), a local mobile anchor (LMA), or a mobile access gateway (MAG).

28. A second entity comprising a processor and a memory, wherein the memory stores instructions that, when executed by the processor, cause the processor to implement operations, the operations comprising:
receiving a first message from a first entity,
where the first message comprises an identifier (a) identifying at least one binding relation that is part of a plurality of binding relations and (b) indicating the at least one binding relation needs to be deleted,
where the plurality of binding relations comprises a plurality of mappings between information associated with a home address (HoA) and a plurality of care of addresses (CoAs),
where the HoA is used to identify a mobile node (MN) in a home network, and where each of the plurality of CoAs is used to identify the MN in a foreign network; and
returning a second message comprising second information that at least comprises a part of the first message.

29. The second entity according to claim 28, where the first entity is a local mobile anchor (LMA) and the second entity is a mobile access gateway (MAG).

30. The second entity according to claim 28, where the first entity is a mobile access gateway (MAG) and the second entity is a local mobile anchor (LMA).

31. The second entity according to claim 28, where the operations further comprise: deleting the at least one binding relation.

32. The second entity according to claim 31, where the first entity is a mobile access gateway (MAG) and the second entity is a local mobile anchor (LMA).

33. The second entity according to claim 31, where the first entity is a local mobile anchor (LMA) and the second entity is a mobile access gateway (MAG).

34. The second entity according to claim 31, where the first entity is a home agent (HA) and the second entity is the MN.

35. The second entity according to claim 28, where the first message further comprises one or more of:
CoA information corresponding to the at least one binding relation;
a CoA prefix corresponding to the at least one binding relation;
a destination IP address carried in the first message; and a part of the first message other than an IP header of the first message.

36. The second entity according to claim 28, where the first message is a Binding Revocation Indication (BRI) message, and the second message is a Binding Revocation acknowledgement (BRA) message.

37. A system comprising a first entity on a network side and a second entity, where
the second entity comprising a processor and a memory, wherein the memory stores instructions that, when executed by the processor, cause the processor to implement operations, the operations comprising:
receiving a first message from a first entity,
where the first message comprises an identifier (a) identifying at least one binding relation that is part of a plurality of binding relations and (b) indicating the at least one binding relation needs to be deleted,
where the plurality of binding relations comprises a plurality of mappings between information associated with a home address (HoA) and a plurality of care of addresses (CoAs),
where the HoA is used to identify a mobile node (MN) in a home network, and where each of the plurality of CoAs is used to identify the MN in a foreign network; and
returning a second message comprising second information that at least comprises a part of the first message.

38. The system according to claim 37, where the second entity is selected from a group consisting of: a mobile access gateway (MAG), a local mobile anchor (LMA) and a home agent.

39. The system according to claim 37, where the first message further comprises one or more of:
CoA information corresponding to the at least one binding relation;
a CoA prefix corresponding to the at least one binding relation;
a destination IP address carried in the first message; and
a part of the first message other than an IP header of the first message.

40. The system according to claim 37, where the first message is a Binding Revocation Indication (BRI) message, and the second message is a Binding Revocation acknowledgement (BRA) message.

41. The system according to claim 37, where the operations further comprise: deleting the at least one binding relation.

42. The system according to claim 41, where the first entity is a local mobile anchor (LMA) and the second entity is a mobile access gateway (MAG).

* * * * *